United States Patent
Rahiminejad et al.

(10) Patent No.: US 11,349,183 B2
(45) Date of Patent: May 31, 2022

(54) CONTACTLESS WAVEGUIDE SWITCH AND METHOD FOR MANUFACTURING A WAVEGUIDE SWITCH

(71) Applicants: Sofia Rahiminejad, Kullavik (SE); Peter Enoksson, Gothenburg (SE); Sjoerd Haasl, Årsta (SE)

(72) Inventors: Sofia Rahiminejad, Kullavik (SE); Peter Enoksson, Gothenburg (SE); Sjoerd Haasl, Årsta (SE)

(73) Assignee: RISE RESEARCH INSTITUTES OF SWEDEN AB, Borås (SE)

( * ) Notice: Subject to any disclaimer, the term of this patent is extended or adjusted under 35 U.S.C. 154(b) by 0 days.

(21) Appl. No.: 16/762,332

(22) PCT Filed: Nov. 5, 2018

(86) PCT No.: PCT/SE2018/051128
§ 371 (c)(1),
(2) Date: May 7, 2020

(87) PCT Pub. No.: WO2019/093948
PCT Pub. Date: May 16, 2019

(65) Prior Publication Data
US 2020/0381793 A1    Dec. 3, 2020

(30) Foreign Application Priority Data
Nov. 7, 2017 (SE) .................................... 1730270-4

(51) Int. Cl.
*H01P 1/12* (2006.01)
*H01P 11/00* (2006.01)

(52) U.S. Cl.
CPC .............. *H01P 1/122* (2013.01); *H01P 11/00* (2013.01)

(58) Field of Classification Search
CPC ........................................................ H01P 1/12
See application file for complete search history.

(56) References Cited

U.S. PATENT DOCUMENTS 8,022,794 B2 * 9/2011 Nakatsuka ........... H01H 1/0036
333/262
2011/0069963 A1 3/2011 Mclaren et al.
(Continued)

FOREIGN PATENT DOCUMENTS

WO    2017140137 A1    8/2017

OTHER PUBLICATIONS

Daneshmand, et al., "RF MEMS Waveguide Switch", IEEE Transactions on Microwave Theory and Techniques, Dec. 2004, vol. 52, No. 12, pp. 2651-2657.
(Continued)

*Primary Examiner* — Dean O Takaoka
(74) *Attorney, Agent, or Firm* — Buchanan Ingersoll & Rooney P.C.

(57) ABSTRACT

A waveguide switch for switching between an ON-state and an OFF-state for a waveguide channel, including: a moveable waveguide switch body including: an input opening for receiving an electromagnetic wave, an output opening for releasing an electromagnetic wave, wherein the waveguide switch body further includes a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is a rotational or translation movement of the waveguide switch body. Also, a waveguide system employ-
(Continued)

ing such a switch and a method of manufacturing such a switch. Contactless switching is provided in a high-frequency system.

19 Claims, 17 Drawing Sheets

(56) References Cited

U.S. PATENT DOCUMENTS

| | | |
|---|---|---|
| 2012/0033283 A1 | 2/2012 | Halsema |
| 2013/0301983 A1 | 11/2013 | Mazumder et al. |
| 2016/0172731 A1* | 6/2016 | Kawamura ............. H01P 1/122 333/108 |

OTHER PUBLICATIONS

Jaafar, et al., "A comprehensive study on RF MEMS switch", Microsyst Technol, 2014 (month unknown), vol. 20, pp. 2109-2121.
John, "Strong Localization of Photons in Certain Disordered Dielectric Superlattices", Physical Review Letters, Jun. 1987, vol. 58, No. 23, pp. 2486-2489.
Kildal, "Three Metamaterial-based Gap Waveguides between Parallel Metal Plates for mm/submm Waves", 3rd European Conference ON Antennas and Propagation (EuCAP 2009), Mar. 2009, vol. 8, pp. 84-87.
Kildal, et al., "Design and experimental verification of ridge gap waveguide in bed of nails for parallel-plate mode suppression", IET Microwaves, Antennas Propag., 2011 (month unknown), vol. 5, No. 3, pp. 262-270.
Kildal, et al., "Local Metamaterial-Based Waveguides in Gaps Between Parallel Metal Plates", IEEE Antennas and Wireless Propagation Letters, 2009 (month unknown), vol. 8, pp. 84-87.
Silveirinha, et al., "Electromagnetic Characterization of Textured Surfaces Formed by Metallic Pins", IEEE Transactions on Antennas and Propagation, Feb. 2008, vol. 56, No. 2, pp. 405-415.
Tazzoli, et al., "Reliability Issues in RF-MEMS Switches Submitted to Cycling and ESD Test", IEEE International Reliability Physics Symposium Proceedings, 2006 (month unknown), pp. 410-415.
Yablonovitch, "Inhibited Spontaneous Emission in Solid-State Physics and Electronics", Physical Review Letters, May 1987, vol. 58, No. 20, pp. 2059-2062.
International Search Report (PCT/ISA/210) and Written Opinion (PCT/ISA/237) dated Feb. 1, 2019, by the Swedish Patent Office as the International Searching Authority for International Application No. PCT/SE2018/051128.
Rahiminejad et al., "Rapid Manufacturing of OSTE Polymer RF-MEMS Components", IEEE 30th International Conference 1-24 on Micro Electro Mechanical Systems (MEMS), 2017, pp. 901-904.

* cited by examiner

CONTACTLESS WAVEGUIDE SWITCH AND METHOD FOR MANUFACTURING A WAVEGUIDE SWITCH

FIELD OF THE INVENTION

The present invention relates to electromagnetic waveguide switching method for switching between ON and OFF states in a waveguide for electromagnetic wave control. The present invention also relates to a method for manufacturing such a device.

BACKGROUND OF THE INVENTION

Metamaterials are materials whose electromagnetic or acoustic properties depend ON its structure rather than the basic element it is composed of. By designing unit cells that are small compared to the wavelength and placing them in an array, its properties can be tuned to manipulate the wave. Electromagnetic metamaterials can block, absorb, enhance and even bend electromagnetic waves. Metamaterials designed for microwaves have unit cells in the order of millimeters, while photonic metamaterials are in the order of nanometers. Electromagnetic bandgap metamaterials can control propagation, guide it in specific directions and prohibit it in other directions. Metamaterials come in many varieties and one type used for higher frequencies are photonic crystals. The phase of an incoming electromagnetic wave can be controlled by using a photonic crystal. They are based ON alternating materials with different dielectric constants and shapes, and were first introduced in 1987 by two independent researchers E. Yablonovitch [1] and S. John [2].

Recently, a new waveguide technology known as gap waveguide technology has been presented. The technology is based ON utilizing metamaterials to confine the propagating electromagnetic wave instead of solid conductive walls as the, as of today, standard rectangular waveguide. The metamaterial most used for gap waveguides, the so-called bed of nails [3], acts as an artificial magnetic conductor (an AMC) and together with a perfect electric conductor (PEC) placed opposed it, an electromagnetic stopband is created between the two surfaces, see FIG. 1A. By placing a PEC surface in between the AMC surfaces, a path for the electromagnetic wave to propagate has been established. However, the electromagnetic wave cannot propagate, i.e. deviate, away from the path due to the stopband ON both sides, FIG. 1B.

Gap waveguides were first presented in 2009 and exist in three variants, namely ridge, groove and microstrip gap waveguides [4, 5]. In 2010, the first realized gap waveguide for 10-20 GHz was presented [6]. Since then, variants of different gap waveguide devices have been designed and fabricated, such as packaging of microstrip circuits, microstrip filters, groove gap waveguide based filters, antennas and an MMIC amplifier.

MEMS (Microelectromechanical systems) switches are used in planar technologies such as microstrip lines, where they either make a short (on) or an open circuit (OFF), which results in a higher isolation and lower losses than conventional semiconductor switches [7]. These states are realized by mechanical contact, often by either a fixed-fixed beam setup or a cantilever beam setup. These types of MEMS switches have been developed since the 1980s [8]. The mechanical contact used in MEMS switches, generates both mechanical and electrical problems such as mechanical stress, deformation, stiction and, if cycled many times, problems with ohmic contact resistance [9] or capacitive coupling. These issues result in low reliability and are one of the reasons why MEMS switches are not used so much in commercial applications.

At higher frequencies, microstrip lines are too lossy and rectangular waveguides are used instead. Waveguide switches are relatively new and only a few have been reported so far. One of the earliest waveguide MEMS switches was presented in 2004, but only operated up to 27 GHz [10]. Other waveguide switches have followed, however, they all rely ON electrical and mechanical contact, and thus the above mentioned problems are still an issue. Therefore, there is a need for a contactless waveguide switch.

One application for a contactless waveguide switch is within a receiver system. The receiver and its antennas form a significant part of a high-resolution heterodyne spectrometer system. To save space and limit large moving objects, the antenna should be planar with an array of radiating elements unlike the common parabolic antenna. To steer the beam, the phase and amplitude of each radiating element of the planar antenna array need to be controlled to enhance the signal in the desired direction. At frequencies with sub millimeter wavelengths, a rectangular waveguide antenna array is often used due to its low losses. To control each element a waveguide switch is needed.

REFERENCES

[1] E. Yabloovitch, "Inhibited Spontaneous Emission in Solid-State Physics and Electronics," Physical Review Letters, vol. 58, no. 20, pp. 2059-2062, 1987.

[2] S. John, "Strong Localization of Photons in Certain Disordered Dielectric Supperlattices," Physical Review Letters, vol. 58, no. 23, pp. 2486-2489, 1987.

[3] M. G. Silveirinha, et al., "Electromagnetic characterization of textured surfaces formed by metallic pins," IEEE Transactions ON Antennas and Propagation, vol. 56, pp. 405-415, 2008.

[4] P.-S. Kildal, et al., "Local metamaterial-based waveguides in gaps between parallel metal plates," IEEE Antennas Wirel. Propag. Lett., vol. 8, pp. 84-87, 2009.

[5] P.-S. Kildal, "Three metamaterial-based gap waveguides between parallel metal plates for mm/submm waves," in 3rd European Conference ON Antennas and Propagation (EuCAP 2009), 2009, vol. 8, no. March, pp. 84-87.

[6] P.-S. Kildal, et al., "Design and experimental verification of ridge gap waveguide in bed of nails for parallel plate mode suppression," IET Microwaves, Antennas Propag., vol. 5, no. 3, pp. 262-270, 2011.

[7] H. Jaafar et al., "A comprehensive study ON RF MEMS switch," Microsyst. Technol., pp. 2109-2121, 2014.

[8] G. M. Rebeiz, RF MEMS: Theory, Design, and Technology. John Wiley & Sons, 2003.

[9] A. Tazzoli, et al., "Reliability issues in RF-MEMS switches submitted to cycling and ESD test," in IEEE International Reliability Physics Symposium Proceedings, 2006, pp. 410-415.

[10] M. Daneshmand, et al., "RF MEMS waveguide switch," in 2004 IEEE MTT-S International Microwave Symposium Digest (IEEE Cat. No. 04CH37535), vol. 2, pp. 589-592.

SUMMARY OF THE INVENTION

In view of the above-mentioned and other drawbacks of the prior art, it is thus an object of the present invention to at least partially alleviate the above mentioned problem.

Furthermore, it is also an object of the present invention to provide an improved and, in particular, more reliable waveguide switch.

According to a first aspect of the present invention, it is therefore provided a waveguide switch for repeated use in a waveguide, e.g. for switching between an ON state and an OFF state for a waveguide channel. The waveguide comprising:

a moveable waveguide switch body comprising:
an input opening for receiving an electromagnetic wave,
an output opening for releasing an electromagnetic wave,
wherein the waveguide switch body further comprises a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is a rotational or translation movement of the waveguide switch body.

Hereby, a contactless waveguide switch is provided. By contactless we mean that the reconfiguration between the ON and OFF states are performed without initiating, changing or interrupting any mechanical contact.

According to a second aspect of the present invention, a waveguide having an alternative solution to the same problems as noted above is provided. The waveguide comprising:

a waveguide switch body comprising:
an input opening for receiving an electromagnetic wave,
an output opening for releasing an electromagnetic wave,
wherein the waveguide switch body further comprises a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is activated by a control voltage to the blocking element.

Hereby, a contactless waveguide switch is provided. By contactless we mean that the reconfiguration between the ON and OFF states are performed without initiating, changing or interrupting any mechanical contact.

According to a third aspect of the present invention, a waveguide having an alternative solution to the same problems as noted above is provided. The waveguide comprising:

a waveguide switch body comprising:
an input opening for receiving an electromagnetic wave,
an output opening for releasing an electromagnetic wave,
an electrically conductive lid has a movable section
wherein the waveguide switch body further comprises a movable element arranged such that in the ON state, an electromagnetic wave may pass from the input opening to the output opening, and in the OFF state the movable element changes the stopband thus diverting an electromagnetic wave traveling from the input opening away from the output opening, whereby the switch from the ON state to the OFF state is activated by electrically, mechanical or thermal actuation of the movable element.

Hereby, a contactless waveguide switch is achieved. By contactless we mean that the reconfiguration between the ON and OFF states are performed without initiating, changing or interrupting any mechanical contact.

According to a fourth aspect of the present invention, a waveguide having an alternative solution to the same problems as noted above is provided. The waveguide comprising:

a waveguide switch body comprising:
an input opening for receiving an electromagnetic wave,
an output opening for releasing an electromagnetic wave,
movable unit elements of a metamaterial surface
wherein the waveguide switch body further comprises a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is a translation movement of one or more unit elements of a metamaterial surface.

Hereby, a contactless waveguide switch is achieved. By contactless we mean that the reconfiguration between the ON and OFF states are performed without initiating, changing or interrupting any mechanical contact.

The waveguide switch should be interpreted to be able to substantially hinder a major portion of an electromagnetic wave being received, in the ON state, and only impede a minor portion of an electromagnetic wave in the OFF state.

In contrast to previous waveguide switches, the embodiments of this invention are directed to switching between ON and OFF states of the waveguide without any mechanical or electrical contact by utilizing metamaterials. The embodiments of the invention can be used at radiofrequencies (3 kHz-300 GHz) as well as millimeter waves (300 GHz-400 THz) and optical frequencies (400 THz-700 THz). By using a metamaterial surface, the propagation of the electromagnetic wave can be controlled without applying physical obstacles that need mechanical and electrical contact.

According to at least one exemplary embodiment, the blocking element comprises a metamaterial, said metamaterial comprises of an array of one or more of the following structures:

Pins;
Grooves;
Springs;
Inverted pyramids;
Holes;
Via holes in a printed circuit board with an electrically conductive surface printed ON top, so called mushroom shapes; and
An alternating pattern of materials with different refractive indexes.

According to at least one exemplary embodiment, the metamaterial is an artificial magnetic conductor.

According to at least one exemplary embodiment, a waveguide system may comprise:

A waveguide switch of the type discussed in the foregoing, and
A waveguide of at least one of the following types: rectangular waveguide, circular waveguide, substrate integrated waveguide, microstriplines, photonic crystals, gap waveguide, and optical waveguide.

According to at least one exemplary embodiment, the metamaterial is an artificial magnetic conductor, and the blocking element further comprises an electric conductive surface to create a stopband.

According to at least one exemplary embodiment, the blocking element comprises a metamaterial and further comprises a tunable conductive surface placed ON top of the blocking element, whereby the tunable conductive surface is capable of switching between a conductive surface and an artificial magnetic conductive surface.

When the tunable conductive surface is non-conductive, the electromagnetic wave is prohibited to propagate across this surface. When the tunable conductive surface is conductive the electromagnetic wave can propagate across.

According to at least one exemplary embodiment, the tunable conductive surface comprises graphene.

According to at least one exemplary embodiment, the ON and OFF states are obtained by changing the distance between the electrically conductive lid and the artificial magnetic conductive surface, thus manipulating the stopband.

According to at least one exemplary embodiment, the distance to the electrically conductive lid and the artificial magnetic conductive surface is performed by moving the electrically conductive lid via electrically, mechanical or thermal actuation.

According to at least one exemplary embodiment, the distance to the electrically conductive lid and the artificial magnetic conductive surface is performed by buckling the electrically conductive lid with electrical or thermal actuation.

According to at least one exemplary embodiment, the electrically conductive lid that together with the artificial magnetic surface creates a stopband has openings covered with a tunable conductive sheet. By changing the conductivity of the tunable conductive sheet, the stopband can be manipulated.

According to at least one exemplary embodiment, the OFF state is realized by pins emerging in a groove gap waveguide channel like pistons, creating a stopband in the middle of the path, thus prohibiting the electromagnetic wave from continuing propagating forward.

According to at least one exemplary embodiment, the movement of the waveguide switch is manufactured using micromachining, nanotechnology, milling, 3D printing, lithography, additive manufacturing, CVD growth and/or molding.

According to at least one exemplary embodiment, the movement of the waveguide switch is actuated using MEMS, nanotechnology and/or an electromechanical actuator.

According to at least one exemplary embodiment, the electromagnetic wave, in use, being released from the output opening has been redirected by the passage through the waveguide switch.

According to at least one exemplary embodiment, the waveguide switch may operate in at least one of the following frequency ranges: 3 kHz-300 GHz, 300 GHz-400 THz, and 400 THz-700 THz.

According to at least one exemplary embodiment, the method for manufacturing a waveguide switch, comprises the steps of:
   providing a waveguide body using one of the previous mentioned manufacturing technologies to fabricate the waveguide body
   using one of the previous mentioned manufacturing technologies to fabricate the waveguide switch
   connecting it to an actuator, a variable voltage regulator, and/or a variable current regulator.
   placing the waveguide switch into a any kind of waveguide system.

BRIEF DESCRIPTION OF THE DRAWINGS

The exemplifying purposes, the invention will now be discussed in more detail with reference to the enclosed drawings, showing exemplary embodiments of the present invention, on which:

FIG. 3B Top view of a ridge gap waveguide with a graphene sheet suspended between the two ridges. Under the graphene sheet there are two pins that acts as an artificial magnetic conductive surface.

DETAILED DESCRIPTION

Figure 1A:
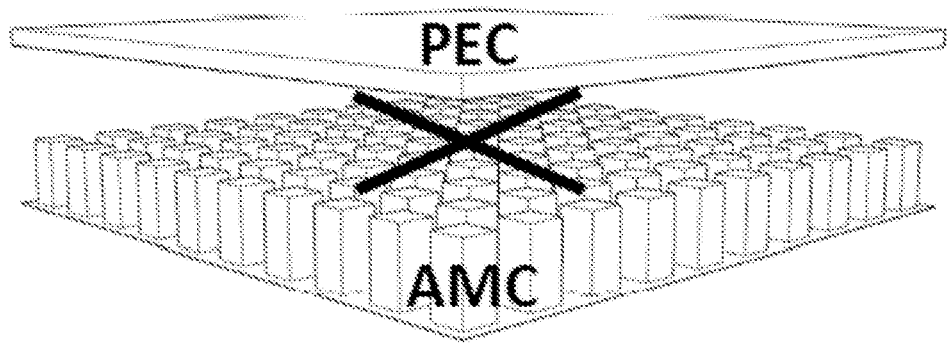
FIG. 1A shows the bed of nails surface (AMC) together with an opposing PEC surface, creating an electromagnetic stopband between the two surfaces.
Figure 1B:
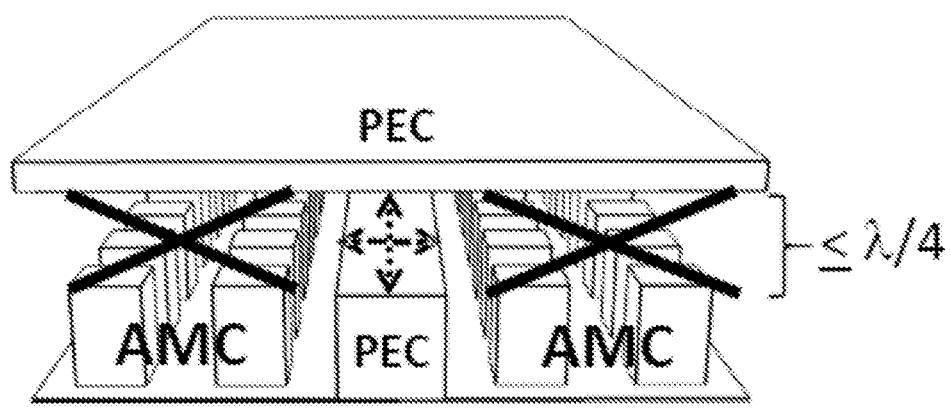
FIG. 1B shows an AMC with a PEC surface embedded in between together with an opposing PEC surface, wherein the arrows symbolize the electric field and the magnetic field, respectively.
Figure 2A:
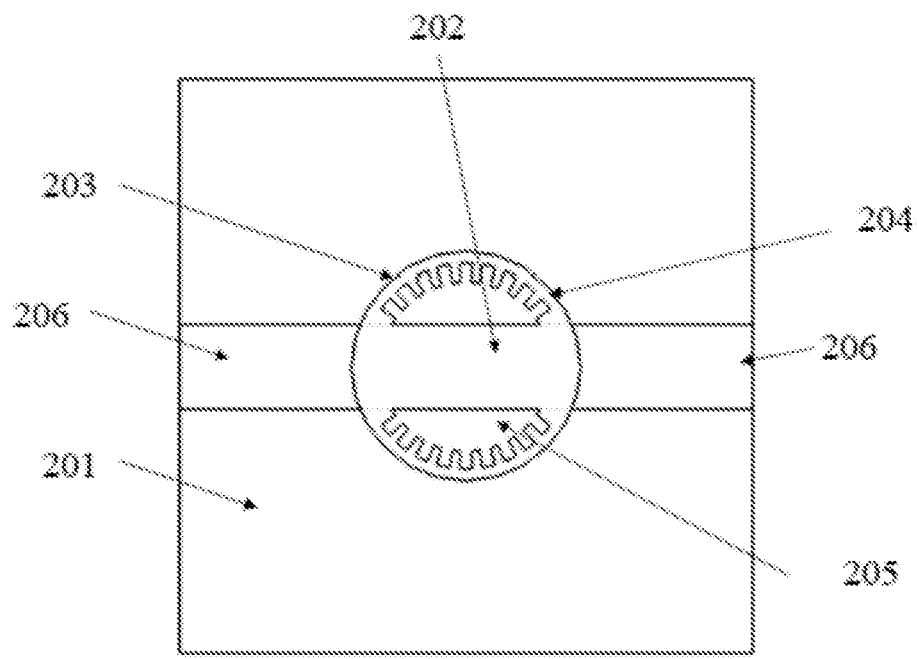
FIG. 2A shows a top view of the rotating waveguide switch in its ON state.
Figure 2B:
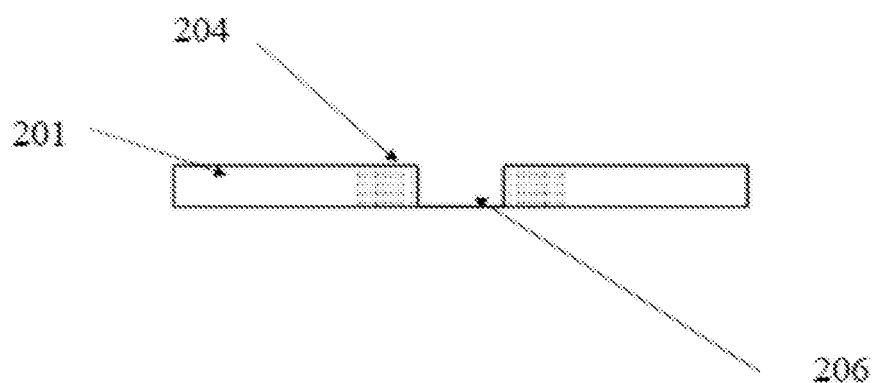
FIG. 2B shows a side view of the rotating waveguide switch in its ON state.
Figure 2C:
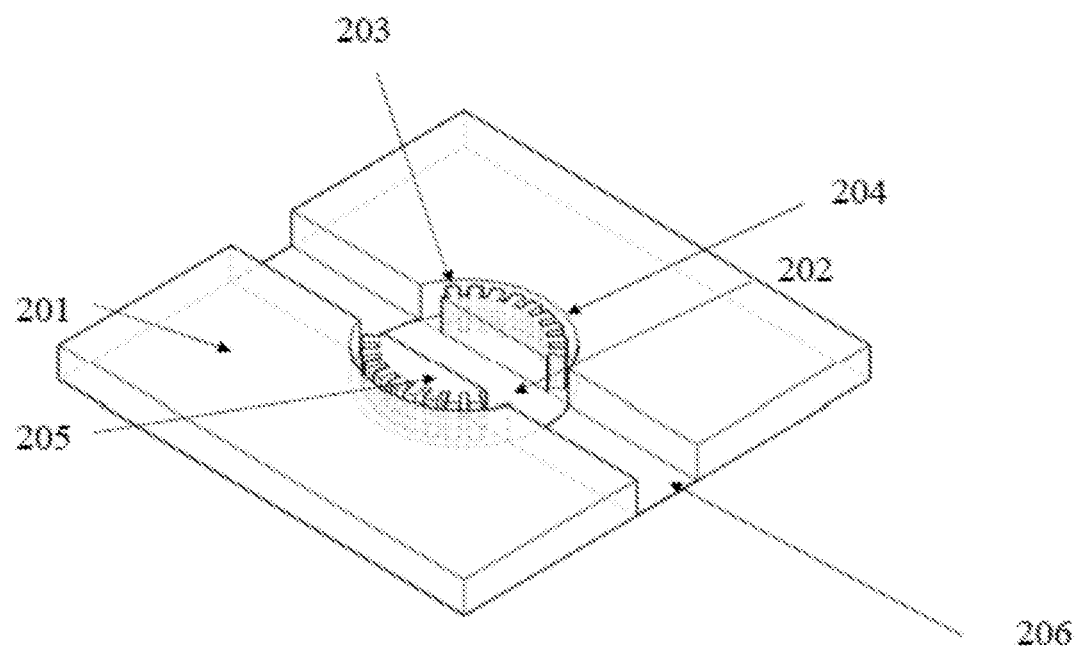
FIG. 2C shows an isometric view of the rotating waveguide switch in its ON state.
Figure 2D:
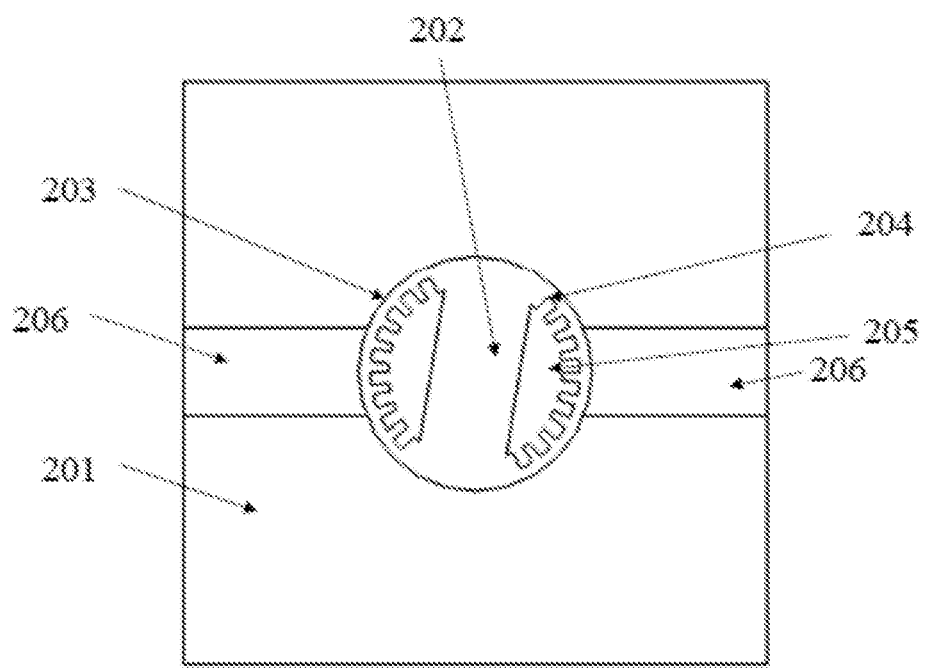
FIG. 2D shows a top view of the rotating waveguide switch in its OFF state.
Figure 2E:
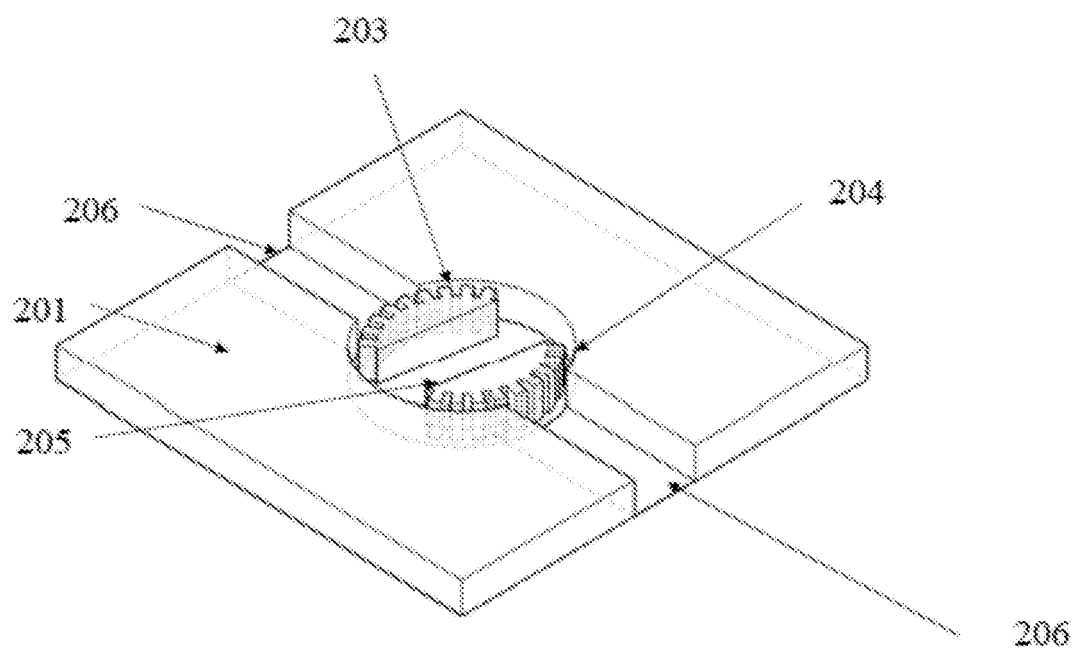
FIG. 2E shows an isometric view of the rotating waveguide switch in its OFF state.

Various aspects of the invention will hereinafter be described in conjunction with the appended drawings to illustrate and not to limit the invention, wherein like designations denote like elements, and variations of the inventive aspects are not restricted to the specifically shown embodiments, but are applicable on other variations of the invention.

Previous waveguide switches achieve an OFF state by blocking the propagating wave with either a solid conductive wall or by an electromagnetic wall where elements smaller than the wavelength are connected. This type of configuration generates problems such as mechanical stress, deformation, stiction and, if cycled many times, problems with ohmic contact resistance, capacitive coupling and mechanical fatigue.

Contrary to the previous described conventional waveguide switches, the embodiments of the invention utilize metamaterials to switch the waveguide between the OFF state and the ON state without any mechanical or electrical contact.

One embodiment of the invention, will now be described with reference to FIG. 2. The device comprises of a waveguide section that can be rotated 205. Outside the rotatable waveguide section a half circle electrically conductive wall 203 is shown. At the periphery of the rotating waveguide section 205 there is a metamaterial surface 204 in the form of pins or grooves that together with the electrically conductive 203 wall creates a stopband. Through the waveguide section a waveguide channel 202 is placed so that electromagnetic wave can travel from the input 206 opening to the output opening 206. Observe that the either side can acts as both input and output opening.

The rotatable waveguide section 205 is placed on a rotating gear underneath, driven e.g. by a microengine pinion gear. The pinion gear may be driven by two linear moving electrostatic actuators, one moving in lateral direction and the other moving in longitudinal direction, together they create a circular movement of the edge of the pinion gear, thus rotating it and in turn rotating the larger gear that the waveguide section is placed on. The gear that the waveguide section is placed upon can also be rotated by a surrounding microchain connected to a microengine further away. Although, in this example the driver is explained as a microdevice, this technology is scalable and can be implemented for larger structures operating at lower frequencies.

When the waveguide switch is in an ON state (FIG. 2A-C), the propagating electromagnetic wave will travel from the input 206 through the waveguide section 205 without leaking to the sides due to the stopband on both sides 203 204. When the waveguide section is rotated to its OFF state (FIG. 2D-E), the waveguide channel is closed, and the surrounding metamaterial 204 will still create a stopband on the sides 203, thus prohibiting the electromagnetic wave from leaking through to the sides 203.

Although pins and/or grooves are described as the metamaterial, those skilled in the art will realize that any metamaterial pattern, e.g. by alternating materials with different dielectric constant, that can create an electromagnetic stopband can be used. Therefore, the concepts, systems and techniques described here are not limited to any type of particular metamaterial surface that can create an AMC surface.

Figure 3A:
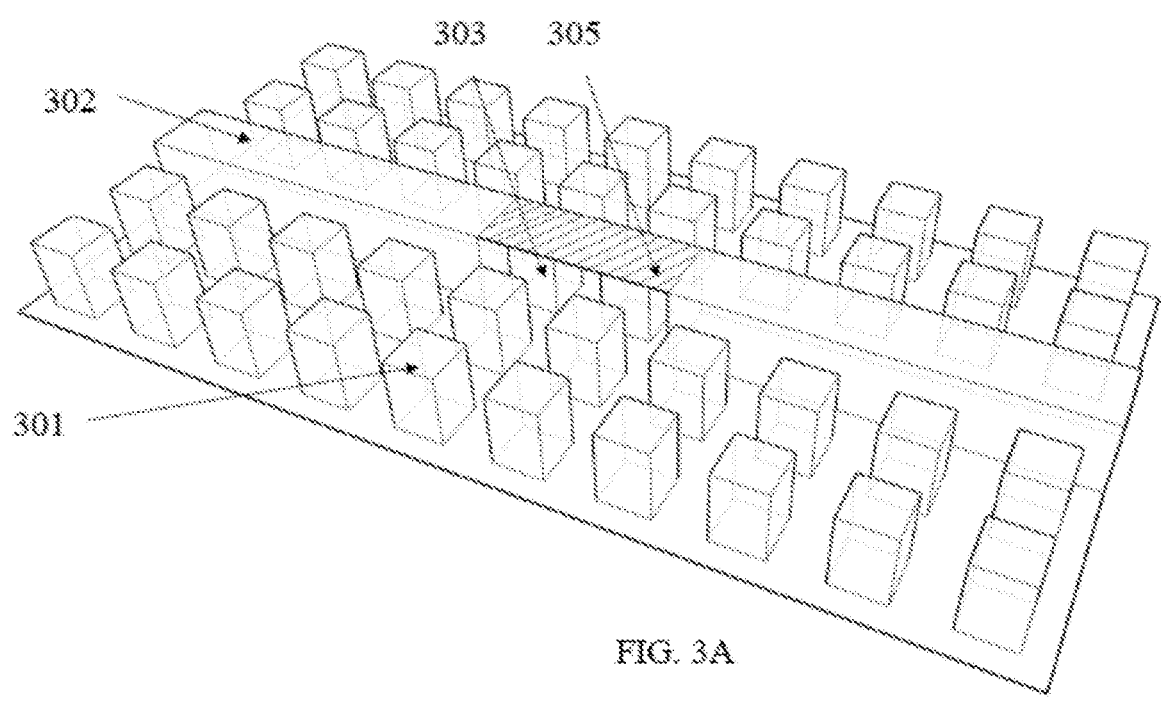
FIG. 3A shows an isometric view of a ridge gap waveguide with a graphene sheet suspended between the two ridges. Under the graphene sheet there are two pins that acts as an artificial magnetic conductive surface.
Figure 3B:
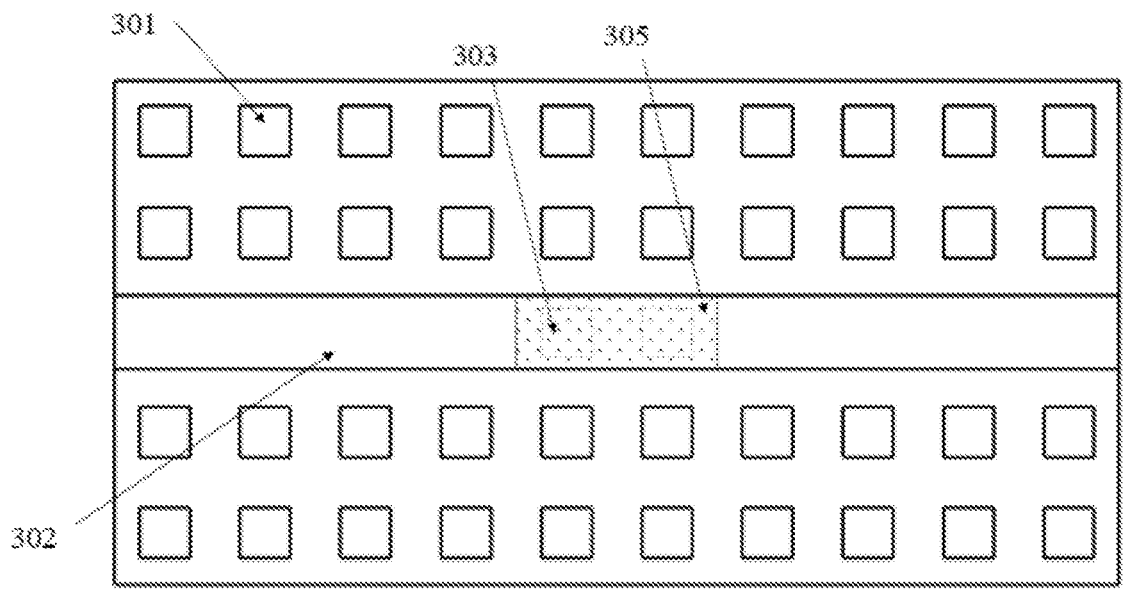
Figure 3C:
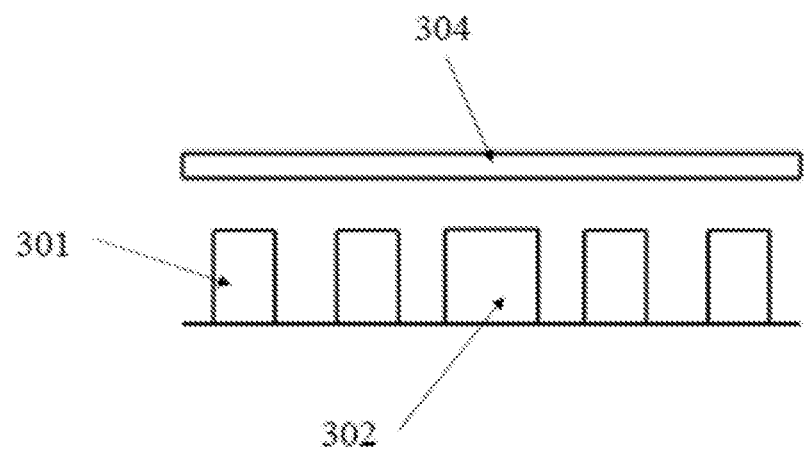
FIG. 3C shows a side view of the ridge gap waveguide with the conductive lid above.
Figure 4A:
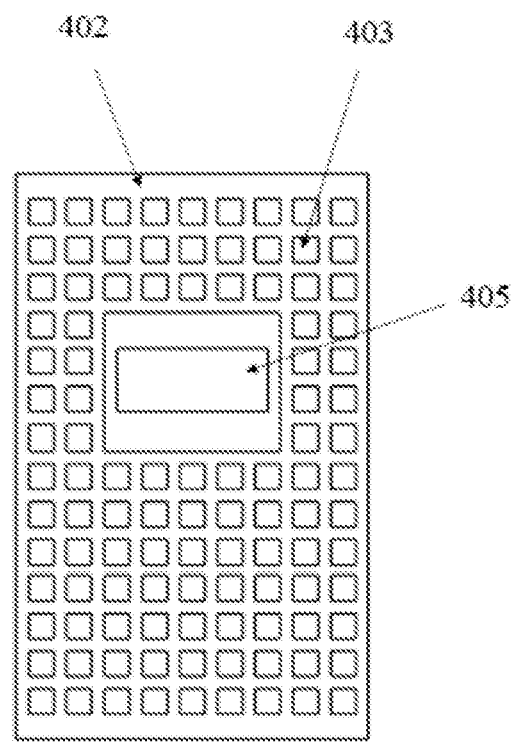
FIG. 4A shows a front view of the waveguide plate with a surrounding metamaterial surface in the form of pins.
Figure 4B:
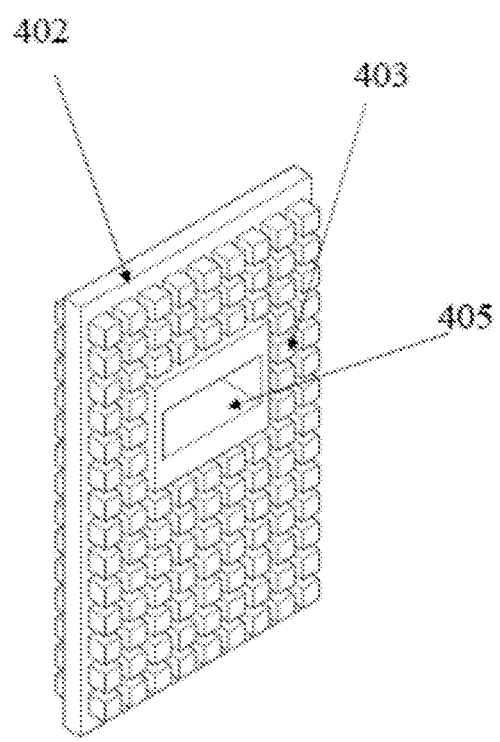
FIG. 4B shows an isometric view of the waveguide plate with a surrounding metamaterial surface in the form of pins.
Figure 4C:
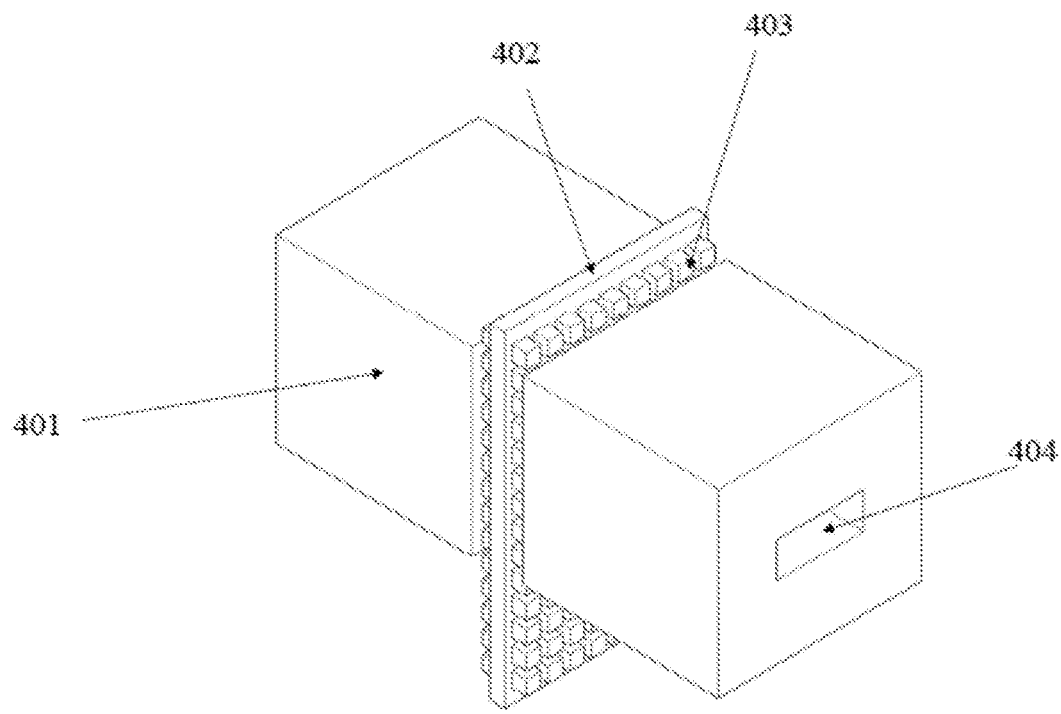
FIG. 4C shows an isometric view of the waveguide switch with the metamaterial covered waveguide plate in its ON state.
Figure 4D:
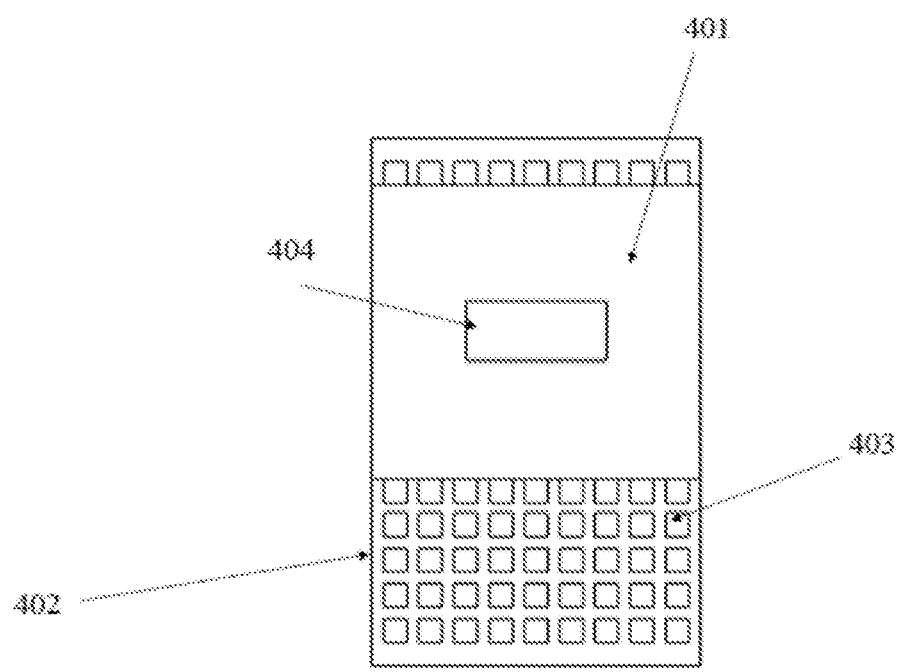
FIG. 4D shows a front view of the waveguide switch with the metamaterial covered waveguide plate in its ON state.
Figure 4E:
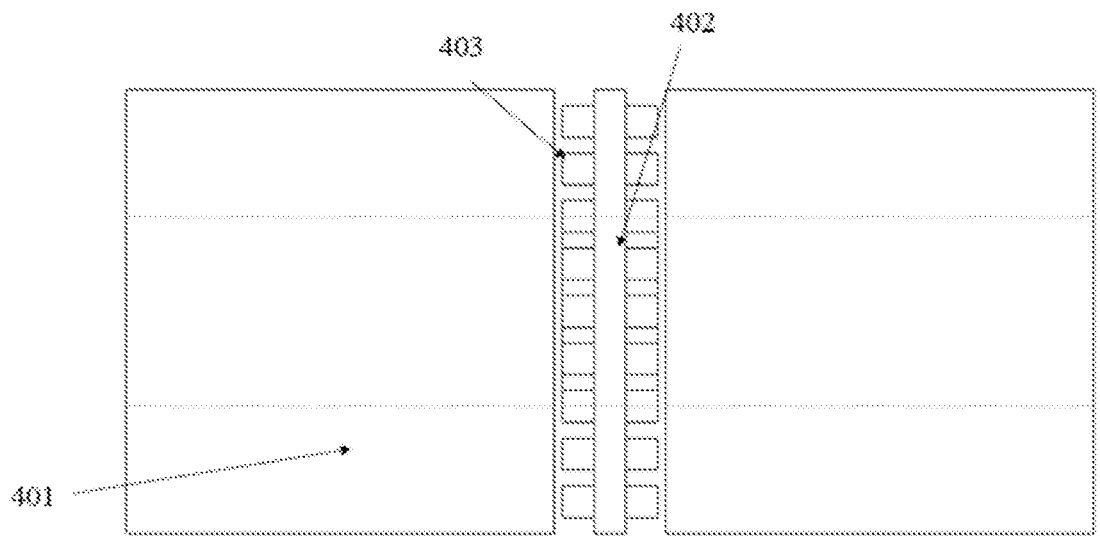
FIG. 4E shows a top view of the waveguide switch with the metamaterial covered waveguide plate in its ON state.
Figure 4F:
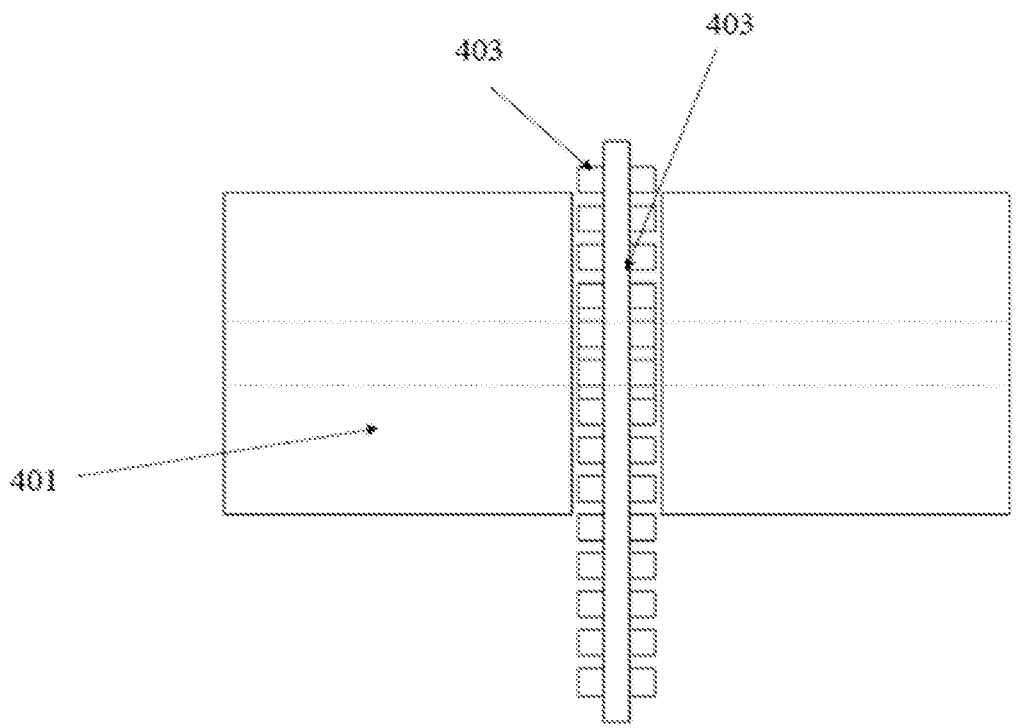
FIG. 4F shows a side view of the waveguide switch with the metamaterial covered waveguide plate in its ON state.
Figure 4G:
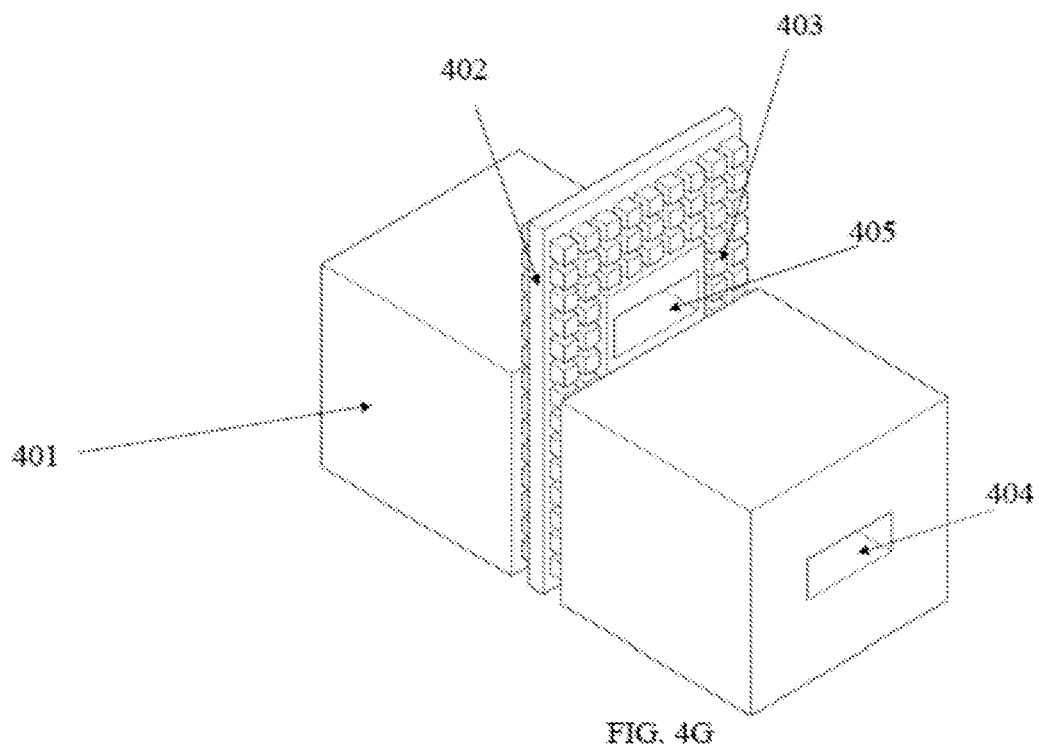
FIG. 4G shows an isometric view of the waveguide switch with the metamaterial covered waveguide plate in its OFF state.
Figure 4H:
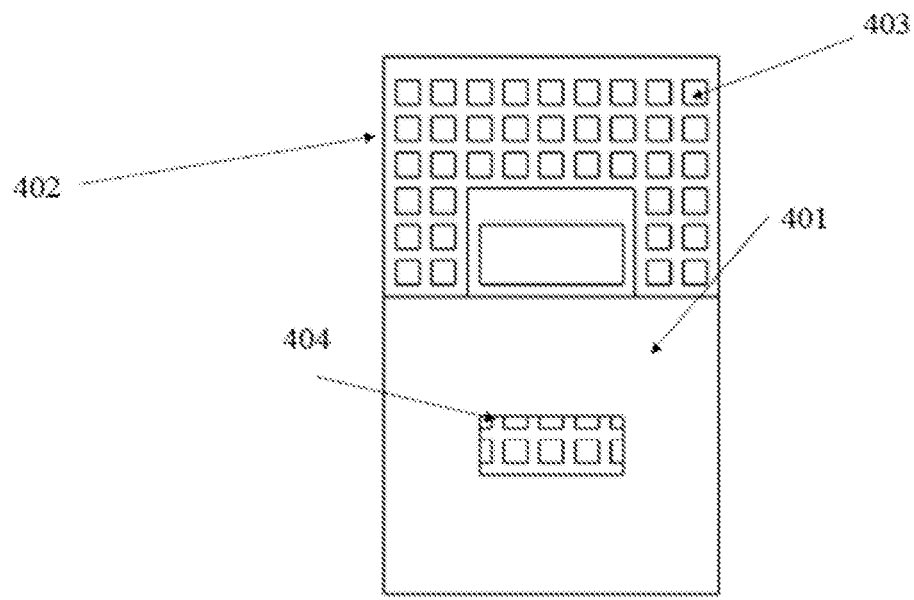
FIG. 4H shows a front view of the waveguide switch with the metamaterial covered waveguide plate in its ON state.
Figure 4I:
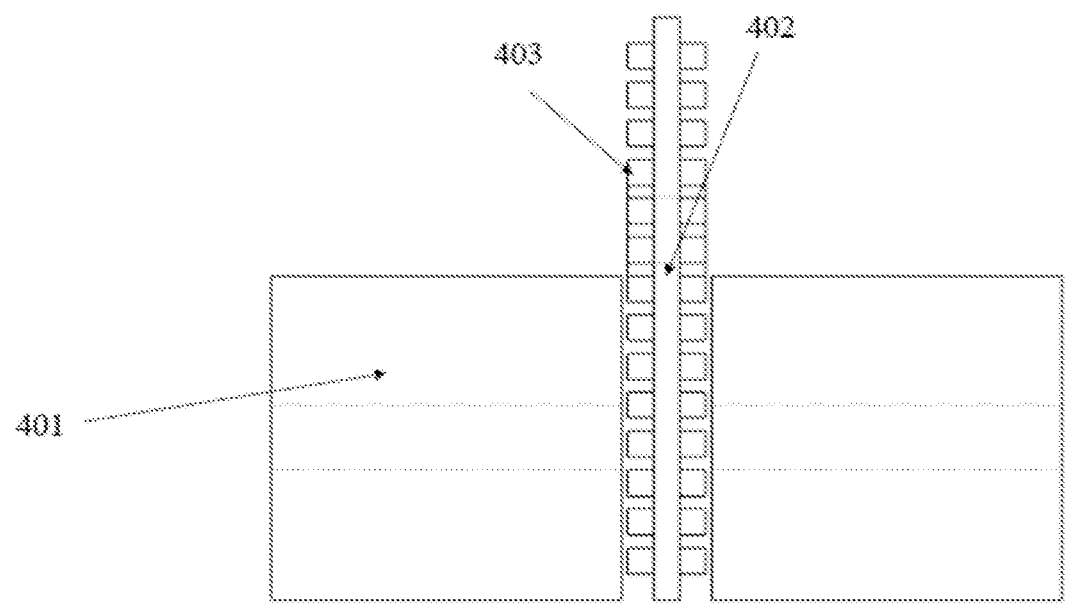
FIG. 4I shows a side view of the waveguide switch with the metamaterial covered waveguide plate in its ON state.
Figure 5A:
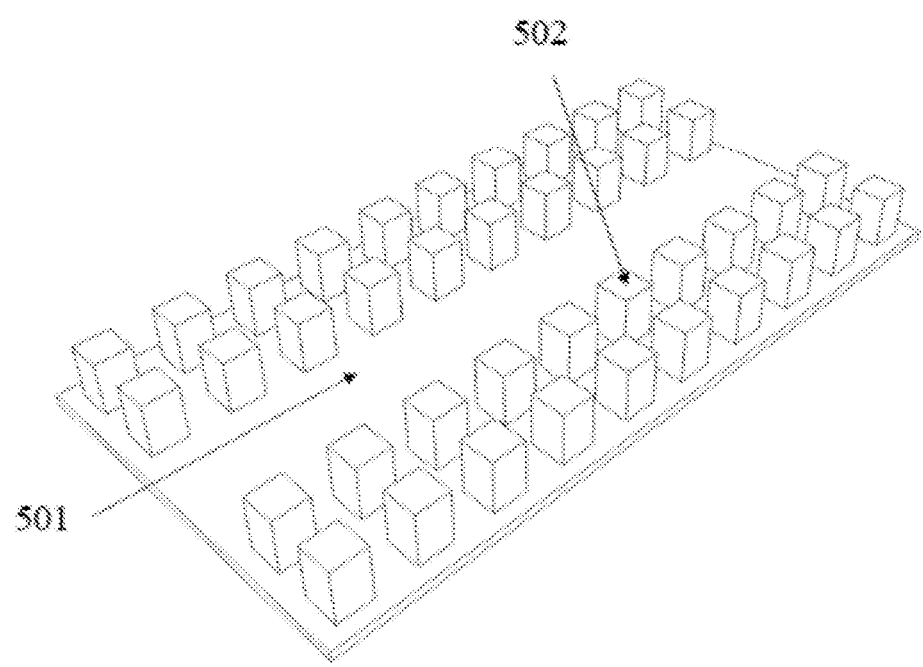
FIG. 5A shows an isometric view of the waveguide switch in its ON state.
Figure 5B:
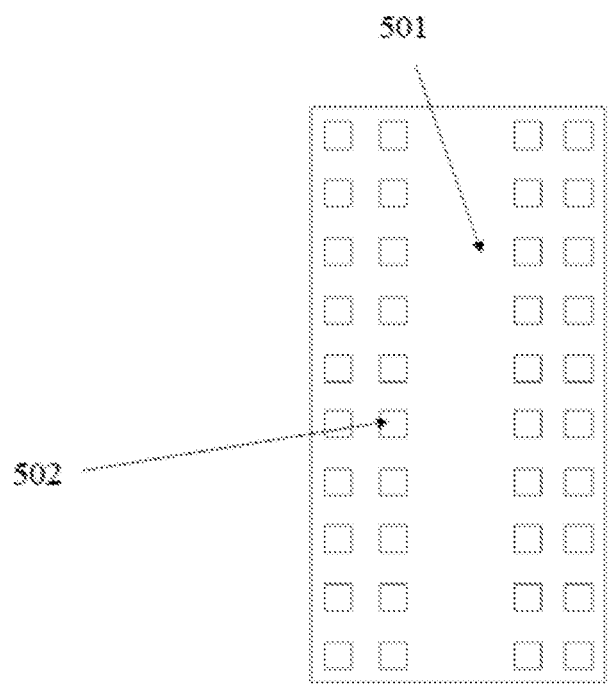
FIG. 5B shows a top view of the waveguide switch in its ON state.
Figure 5C:
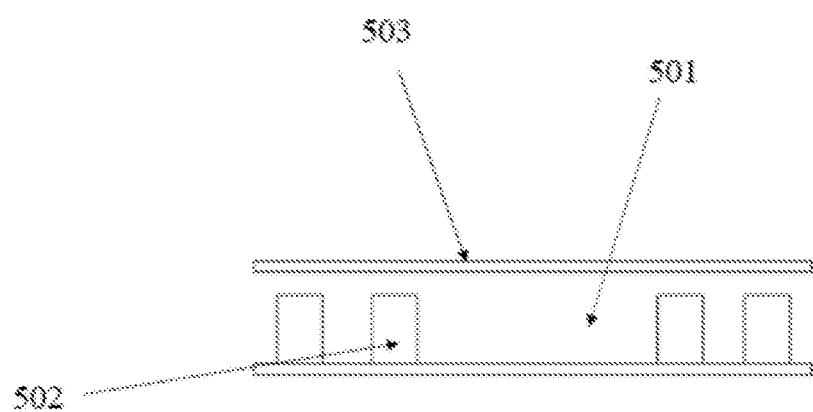
FIG. 5C shows a side view of the waveguide switch in its ON state.
Figure 5D:
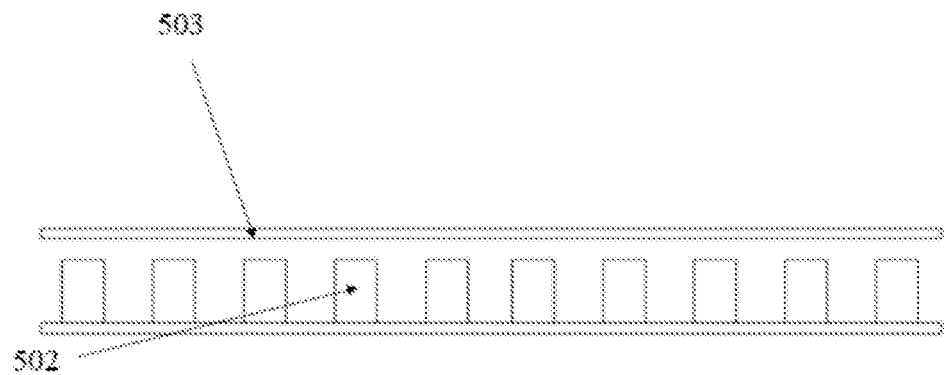
FIG. 5D shows a right side view of the waveguide switch in its ON state.
Figure 5E:
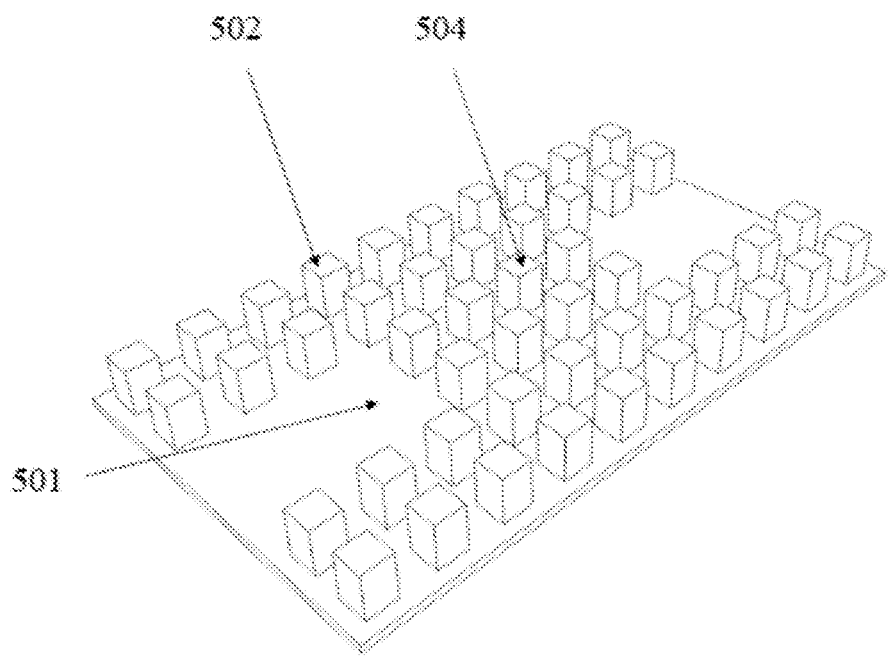
FIG. 5E shows an isometric view of the waveguide switch in its OFF state.
Figure 5F:
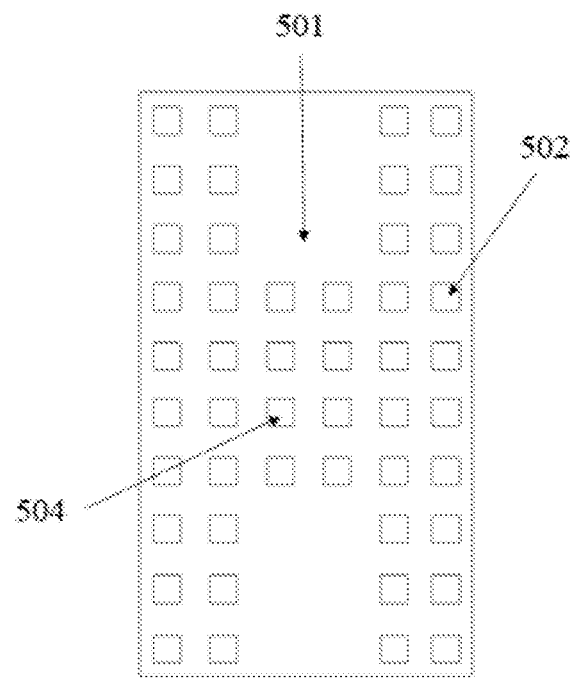
FIG. 5F shows a top view of the waveguide switch in its OFF state.
Figure 5G:
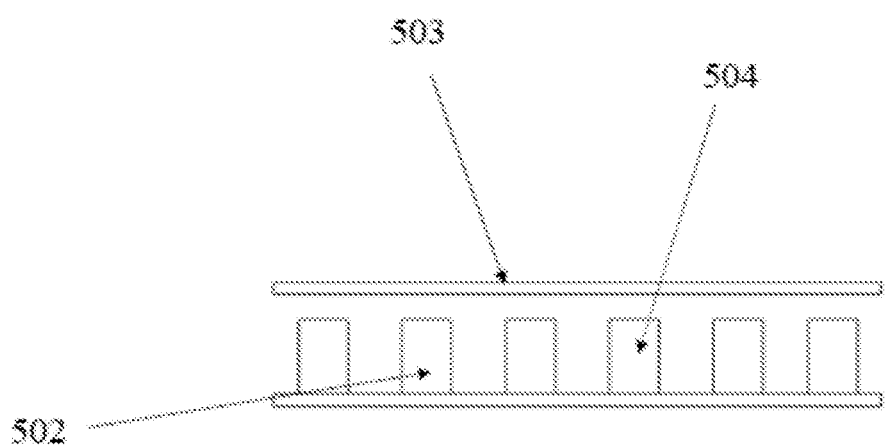
FIG. 5G shows a side view of the waveguide switch in its OFF state.
Figure 6A:
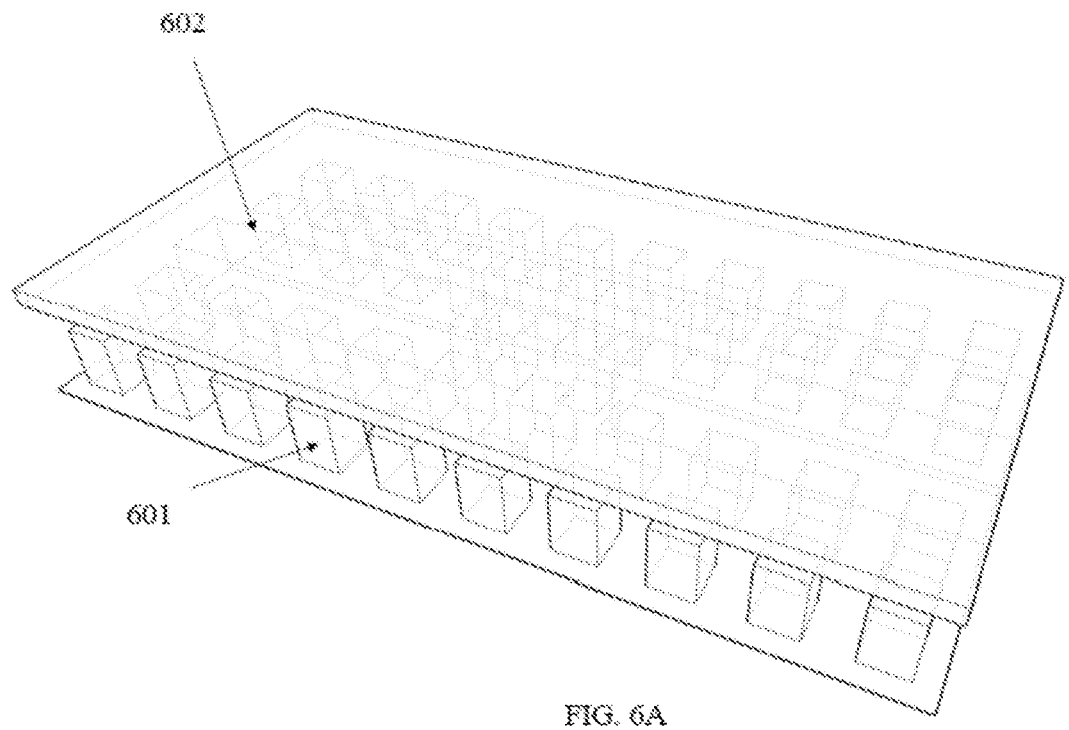
FIG. 6A shows an isometric view of the waveguide switch in its ON state.
Figure 6B:
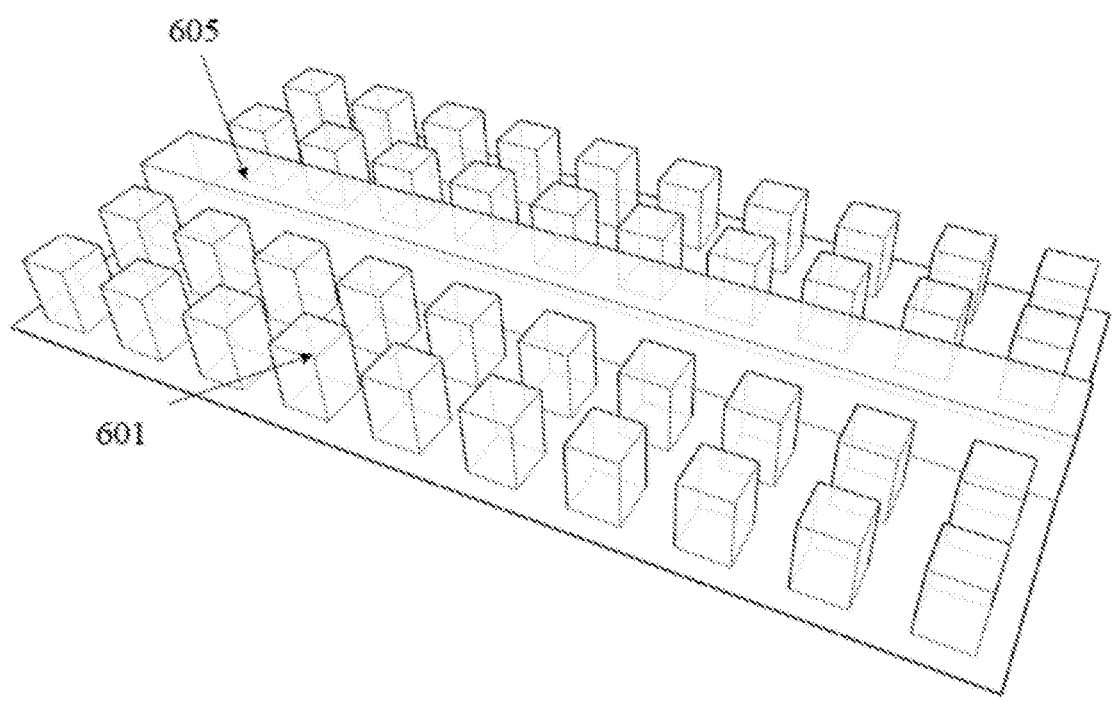
FIG. 6B shows an isometric view of the ridge and the surrounding pins.
Figure 6C:
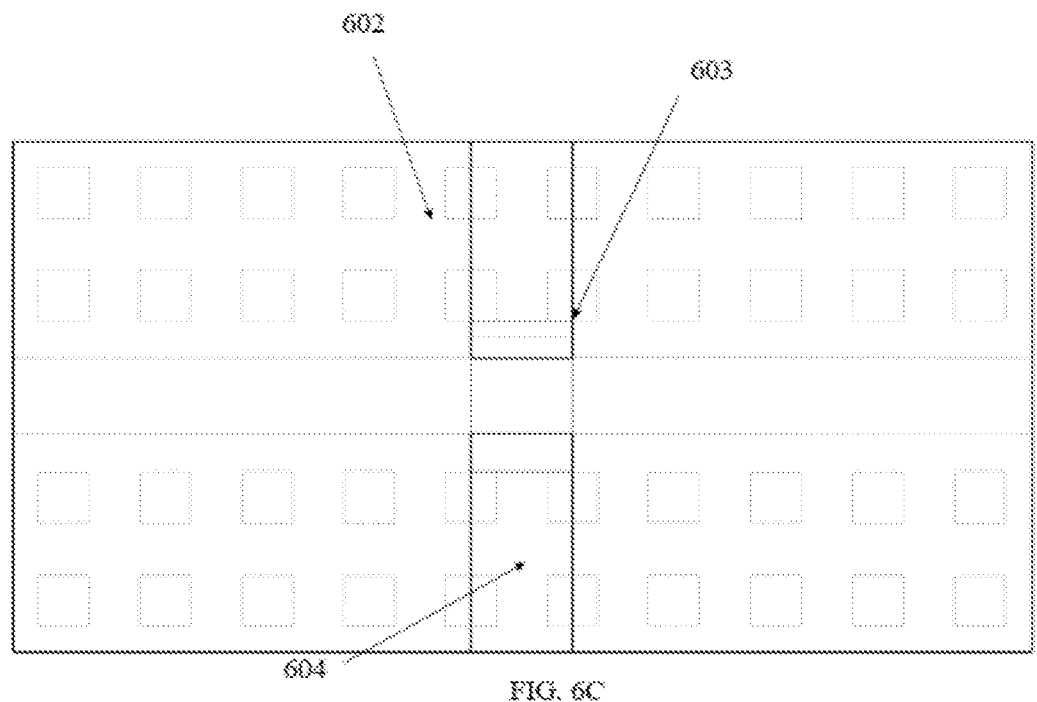
FIG. 6C shows a top view of the waveguide switch in its ON state.
Figure 6D:
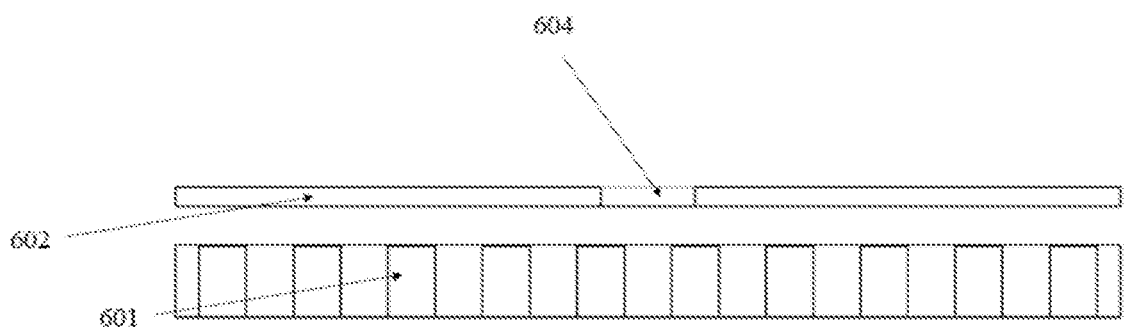
FIG. 6D shows a side view of the waveguide switch in its ON state.
Figure 6E:
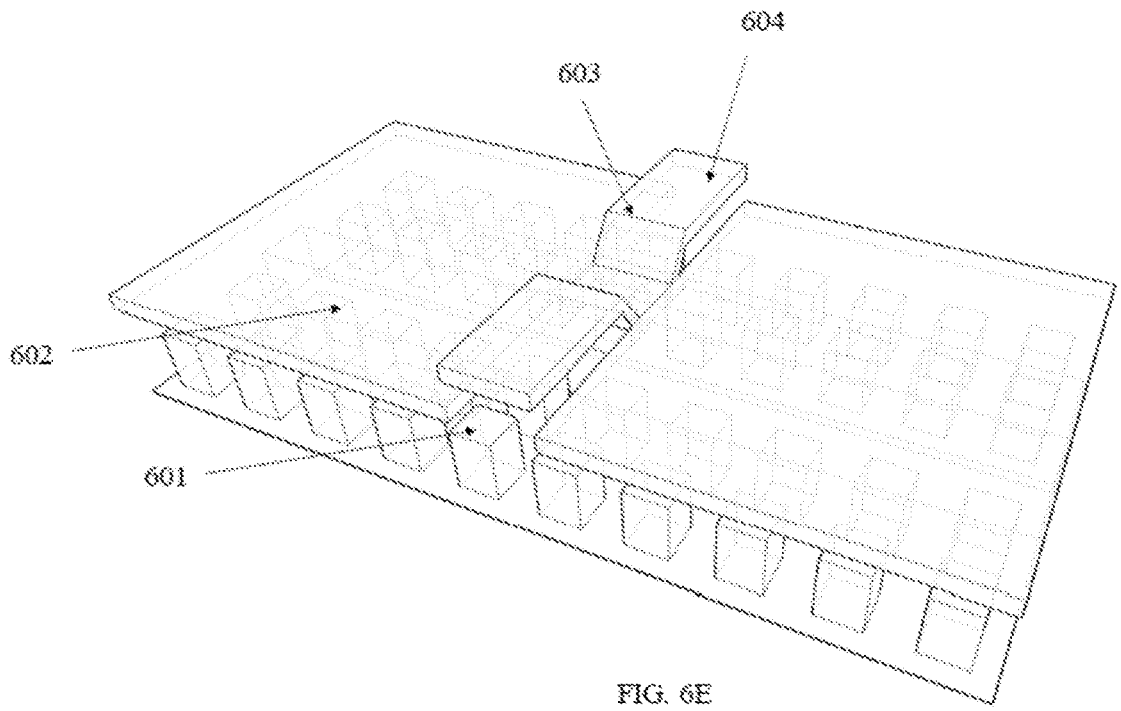
FIG. 6E shows an isometric view of the waveguide switch in its OFF state.
Figure 6F:
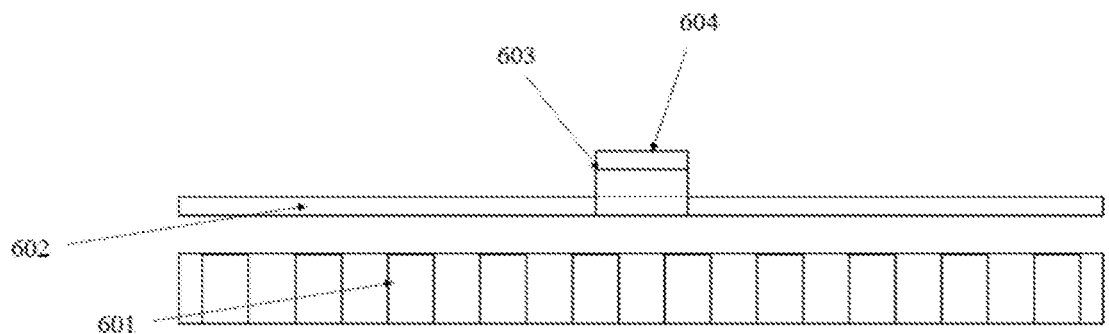
FIG. 6F shows a side view of the waveguide switch in its OFF state.
Figure 6G:
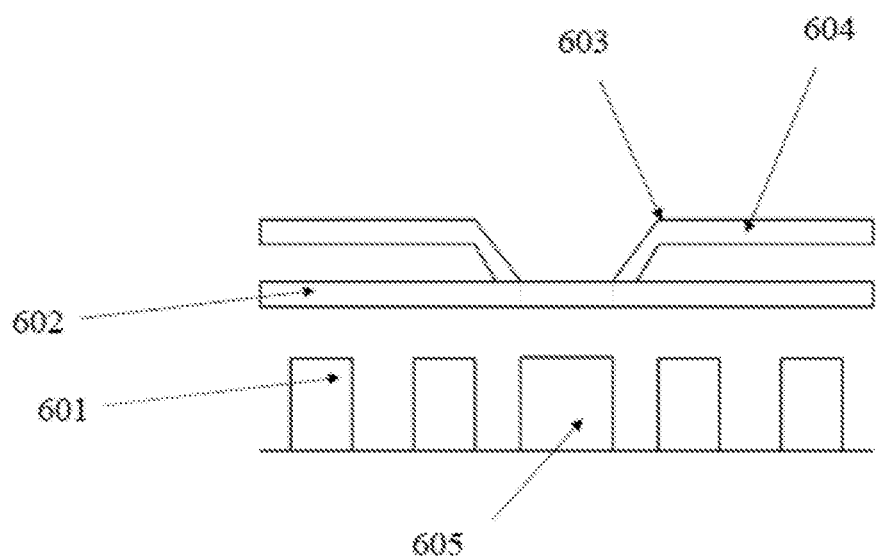
FIG. 6G shows a right side view of the waveguide switch in its OFF state.

Another embodiment will now be described with reference to FIG. 3. The embodiment utilizes the concept of a ridge gap waveguide. A ridge gap waveguide consist of an electrically conductive ridge 302 placed in between an AMC surface 301, in this example the AMC is realized with metallic pins 301. Above the ridge and the AMC an overlying electrically conductive plate 304 is placed, and therefore, there is a stopband outside the ridge and the electromagnetic wave can only travel above the ridge 302 and not to the sides where the AMC 301 is situated.

A section of the ridge is replaced with a metamaterial surface in the form a pins 303. Lying on top of the metamaterial surface 303 is a graphene sheet 305. The graphene sheet 305 is connected to variable voltage regulator. By alternating the applied voltage, or mechanical strain, on the graphene sheet 305, the graphene sheet changes its conductive properties, and can be tuned to have almost no conductivity thus acting like a dielectric or to be fully conductive. The graphene can be connected to the variable voltage regulator for example by connecting a probe to the metallic surface of the AMC 301 or by a via-hole in one of the pins underneath 303, thus electrically connecting the graphene to the backside of the chip where the variable voltage regulator is connected. When the graphene is conductive, the electromagnetic wave can travel across the graphene sheet 305 and the waveguide will be in an ON state. When the graphene sheet is non-conductive the underlying metamaterial 303 will together with the opposing electrical conductive lid 304 create an electromagnetic stopband. The electromagnetic wave can therefore not travel across this surface and will therefore be blocked and reflected back. Similar this kind of material could be used to turn on or off the conductivity of the top plate.

Although graphene is described, those skilled in the art will realize that any material where the conductivity can be altered by the applied voltage can be used. Therefore, the concepts, systems and techniques described here are not limited to any particular type of tunable conductive surface.

Another embodiment will now be described with reference to FIG. 4. The embodiment of the invention utilizes a waveguide plate 402 vertical to the waveguide 401. The plate has a waveguide opening in the center 404, and surrounding the waveguide opening is a metamaterial surface in the form of pins 403. The ON state (FIG. 4A-D) of the switch is when the waveguide opening of the plate 405 is leveled with the waveguides opening 404. By moving the plate either vertically or laterally, the metamaterial surface 403 will block the wave and prohibit it from propagating to the sides, thus creating an OFF state, FIG. 4E-G. The plate is moved vertically or laterally by a motor or by a linear electrostatic actuator.

Another embodiment will now be described with reference to FIG. 5. FIG. 5 shows a groove gap waveguide, comprising of a waveguide channel 501 with a metamaterial surface in the form of pins 502 on both sides of the waveguide channel 501. On top of the groove gap waveguide an electric conductive lid 503 is placed at a distance of less than quarter of a wavelength above it. When the waveguide switch is in its ON state (FIG. 5A-D), the propagating electromagnetic wave will travel from the input of the waveguide channel to the output 501 without leaking to the sides due to the stopband on both sides 502. When the waveguide switch is in its OFF state (FIG. 5E-G), pins 504 will emerge similar to pistons in the waveguide channel 501, creating a stopband in the middle of the channel 501 thus blocking the incoming wave and reflecting it.

Although pins and/or grooves are described as the metamaterial, those skilled in the art will realize that any metamaterial pattern e.g. by alternating materials with different dielectric constant; that can create an electromagnetic stopband can be used. Therefore, the concepts, systems and techniques described here are not limited to any type of particular metamaterial surface that can create an AMC surface.

Another embodiment will now be described with reference to FIG. 6. FIG. 6 shows a ridge gap waveguide with an electrically conductive lid 602 at a distance of less than quarter of a wavelength above it. A section of the electrically conductive lid 604 can be moved so as to alter the distance to the underlying metamaterial surface 601. The movable section of the lid is connected by hinges 603. When the waveguide switch is in its ON state (FIG. 6A-D), the propagating electromagnetic wave will travel from the input of the ridge 605 to the output without leaking to the sides due to the stopband on both sides created by the metamaterial surface 601 and the overlying lid 602. When the waveguide switch is in its OFF state (FIG. 6E-G) the movable section of the lid is elevated so that the stopband is imploded underneath the lid. The electromagnetic wave travelling over the ridge 605 will start to divert to the sides where the movable lid has been elevated since there no longer is a stopband.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A waveguide switch for switching between an ON state and an OFF state for a waveguide channel, comprising:
  a waveguide switch body comprising:
    an input opening for receiving an electromagnetic wave,
    an output opening for releasing an electromagnetic wave,
  wherein the waveguide switch body further comprises a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is activated by a control voltage to the blocking element, and
    wherein the blocking element comprises a metamaterial, said metamaterial comprises of an array of one or more of the following structures:
    Pins;
    Grooves;
    Springs;
    Inverted pyramids;
    Holes;
    Via holes in a printed circuit board with an electrically conductive surface printed ON top, so called mushroom shapes; and
    An alternating pattern of materials with different refractive indexes or dielectric.

2. A waveguide switch for switching between an ON state and an OFF state for a waveguide channel, comprising:
  a waveguide switch body comprising:
    an input opening for receiving an electromagnetic wave,
    an output opening for releasing an electromagnetic wave,
    an electrically conductive lid has a movable section
  wherein the waveguide switch body further comprises a movable element arranged such that in the ON state, an electromagnetic wave may pass from the input opening to the output opening, and in the OFF state the movable element changes the stopband thus diverting an electromagnetic wave traveling from the input opening away from the output opening, whereby the switch from the ON state to the OFF state is activated by electrically, mechanical or thermal actuation of the movable element.

3. A waveguide switch for switching between an ON state and an OFF state for a waveguide comprising:
  a waveguide switch body comprising:
    an input opening for receiving an electromagnetic wave,
    an output opening for releasing an electromagnetic wave, and
  movable unit elements of a metamaterial surface
  wherein the waveguide switch body further comprises a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is a translation movement of one or more unit elements of a metamaterial surface.

4. A waveguide switch for switching between an ON state and an OFF state for a waveguide channel, comprising:
  a moveable waveguide switch body comprising:
    an input opening for receiving an electromagnetic wave,
    an output opening for releasing an electromagnetic wave,
  wherein the waveguide switch body further comprises a blocking element arranged such that in the ON state, an electromagnetic wave may pass from the input opening to the output opening, and in the OFF state the blocking element substantially impedes an electromagnetic wave traveling from the input opening to the output opening, whereby the switch from the ON state to the OFF state is a rotational or translation movement of the waveguide switch body,
    wherein the blocking element comprises a metamaterial, said metamaterial comprises of an array of one or more of the following structures:
    Pins;
    Grooves;
    Springs;
    Inverted pyramids;
    Holes;
    Via holes in a printed circuit board with an electrically conductive surface printed ON top, so called mushroom shapes; and
    An alternating pattern of materials with different refractive indexes or dielectric.

5. A waveguide switch according to claim 4, wherein the metamaterial is an artificial magnetic conductor.

6. A waveguide switch according to claim 5, wherein the metamaterial is an artificial magnetic conductor, and the blocking element further comprises an electric conductive surface to create a stopband.

7. The contactless waveguide switch according to claim 5, where the OFF state is realized by pins emerging in the groove path like pistons, creating a stopband in the middle of the path, thus prohibiting the electromagnetic wave from continuing propagating forward.

8. A waveguide switch according to claim 4, wherein the metamaterial is an artificial magnetic conductor, and the blocking element further comprises an electric conductive surface to create a stopband.

9. A waveguide switch according to claim 4, wherein the blocking element comprises a metamaterial and further comprises a tunable conductive surface placed on top of the blocking element, whereby the tunable conductive surface is capable of switching between a conductive surface and an artificial magnetic conductive surface.

10. A waveguide switch according to claim 9, wherein the tunable conductive surface comprises graphene.

11. The contactless waveguide switch according to claim 4, where the electrically conductive lid that together with the artificial magnetic surface creates a stopband has openings covered with a tunable conductive sheet.

12. A waveguide switch according to claim 4, wherein the ON and OFF states are obtained by changing the distance between the electrically conductive lid and the artificial magnetic conductive surface, thus manipulating the stopband.

13. A waveguide switch according to claim 12, where the distance to the electrically conductive lid and the artificial magnetic conductive surface is performed by moving the electrically conductive lid via electrically, mechanical or thermal actuation.

14. A waveguide switch according to claim 12, where the distance to the electrically conductive lid and the artificial magnetic conductive surface is performed by buckling the electrically conductive lid with electrical, mechanical or thermal actuation.

15. The waveguide switch according to claim 4, where the electrically conductive lid that together with the artificial magnetic surface creates a stopband has openings covered with a tunable conductive sheet.

16. A waveguide switch according to claim 4, wherein the movement of the waveguide switch is actuated using MEMS, nanotechnology and/or an electromechanical actuator.

17. A waveguide switch according to claim 4, wherein the electromagnetic wave, in use, being released from the output opening has been redirected by the passage through the waveguide switch.

18. A waveguide switch according to claim 4, wherein the waveguide switch is operate in at least one of the following frequency ranges: 3 kHz-300 GHz, 300 GHz-400 THz, and 400 THz-700 THz.

19. A waveguide switch according to claim 4, wherein the moveable part of the waveguide switch is manufactured using micromachining, nanotechnology, milling, 3D printing, lithography, additive manufacturing, CVD growth and/or molding.

* * * * *